(12) United States Patent
Vogelsang

(10) Patent No.: US 7,956,644 B2
(45) Date of Patent: Jun. 7, 2011

(54) PEAK POWER REDUCTION USING FIXED BIT INVERSION

(75) Inventor: Thomas Vogelsang, Jericho, VT (US)

(73) Assignee: Qimonda AG, Munich (DE)

( * ) Notice: Subject to any disclaimer, the term of this patent is extended or adjusted under 35 U.S.C. 154(b) by 918 days.

(21) Appl. No.: 11/746,946

(22) Filed: May 10, 2007

(65) Prior Publication Data
US 2008/0282001 A1 Nov. 13, 2008

(51) Int. Cl.
*H03K 19/094* (2006.01)

(52) U.S. Cl. .............. 326/86; 326/26; 326/27; 326/30; 326/87

(58) Field of Classification Search .............. 326/26, 326/27, 30, 86, 87
See application file for complete search history.

(56) References Cited

U.S. PATENT DOCUMENTS

| | | | |
|---|---|---|---|
| 5,107,148 A * | 4/1992 | Millman | 326/56 |
| 5,555,513 A | 9/1996 | Harrington et al. | |
| 5,654,927 A * | 8/1997 | Lee | 365/203 |
| 5,914,909 A * | 6/1999 | Park | 365/230.06 |
| 6,242,962 B1 * | 6/2001 | Nakamura | 327/333 |
| 6,269,033 B1 * | 7/2001 | Ishida et al. | 365/200 |
| 6,563,745 B1 | 5/2003 | Ilkbahar | |
| 6,633,951 B2 | 10/2003 | Cohen | |
| 7,262,637 B2 * | 8/2007 | Pan et al. | 326/83 |
| 7,280,412 B2 * | 10/2007 | Jang et al. | 365/189.07 |
| 7,358,872 B2 * | 4/2008 | Morzano et al. | 341/100 |
| 7,400,541 B2 * | 7/2008 | Jang et al. | 365/189.07 |
| 7,403,036 B2 * | 7/2008 | Bando et al. | 326/56 |
| 7,688,102 B2 * | 3/2010 | Bae et al. | 326/11 |
| 2003/0046483 A1 | 3/2003 | Moschopoulos | |

* cited by examiner

*Primary Examiner* — Linh V Nguyen

(74) *Attorney, Agent, or Firm* — Dicke, Billig & Czaja, PLLC

(57) ABSTRACT

A semiconductor device includes a first circuit block, a second circuit block, and a data bus. The data bus is coupled between the first and second circuit blocks. A first data inverter on the data bus inverts a selected segment of data that is transferred onto the data bus. A second data inverter at an end of the data bus re-inverts the selected segment of data before the data is transferred off the data bus. The data that is transferred onto the data is not analyzed in order to determine the selected segment of data that is inverted.

21 Claims, 5 Drawing Sheets

PEAK POWER REDUCTION USING FIXED BIT INVERSION

BACKGROUND

In many mobile and/or battery-operated electronic devices, the total amount of power consumed by the device is a significant consideration. Many such electronic devices require significant power conservation in the system. Some such electronic devices also include the transferring of data signals within the device along parallel lines of a data bus. For example, a memory or DRAM may be included in the electronic device, and such memory can have a data bus with long parallel lines that transfer data signals within the memory.

In general, a bus used to route significant amounts of data between various parts of the system includes a plurality of parallel and relatively long metal lines or conductors that use switching power in the transmission of data. Each of the metal lines of the data bus may be subject to capacitive coupling from neighboring lines. For example, if a voltage on one of the metal lines is reduced from a logic high voltage to a logic low voltage, a logic high voltage on adjacent lines may also be reduced due to capacitive coupling between the lines. Furthermore, there is a general capacitive load associated with the data bus. For example, a capacitive load can be associated with connecting transistors or due to coupling with signal or power lines above and below a particular line.

As the physical dimensions of a data bus are reduced, and the metal lines are spaced closer together, switching power due to the effect of capacitive coupling and capacitive loading is increased. For many semiconductor devices that are components of systems with such data buses, a significant amount of power consumption is caused by the toggling of long signal buses.

For this and other reasons, there is a need for the present invention.

SUMMARY

One aspect of the present invention includes a semiconductor device with a first circuit block, a second circuit block, and a data bus. The data bus is coupled between the first and second circuit blocks. A first data inverter on the data bus inverts a selected segment of data that is transferred onto the data bus. A second data inverter at an end of the data bus re-inverts the selected segment of data before the data is transferred off the data bus. The data that is transferred onto the data is not analyzed in order to determine the selected segment of data that is inverted.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

FIG. 4 illustrates examples using pre-defined data patterns.
FIG. 5 illustrates examples using random data patterns.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
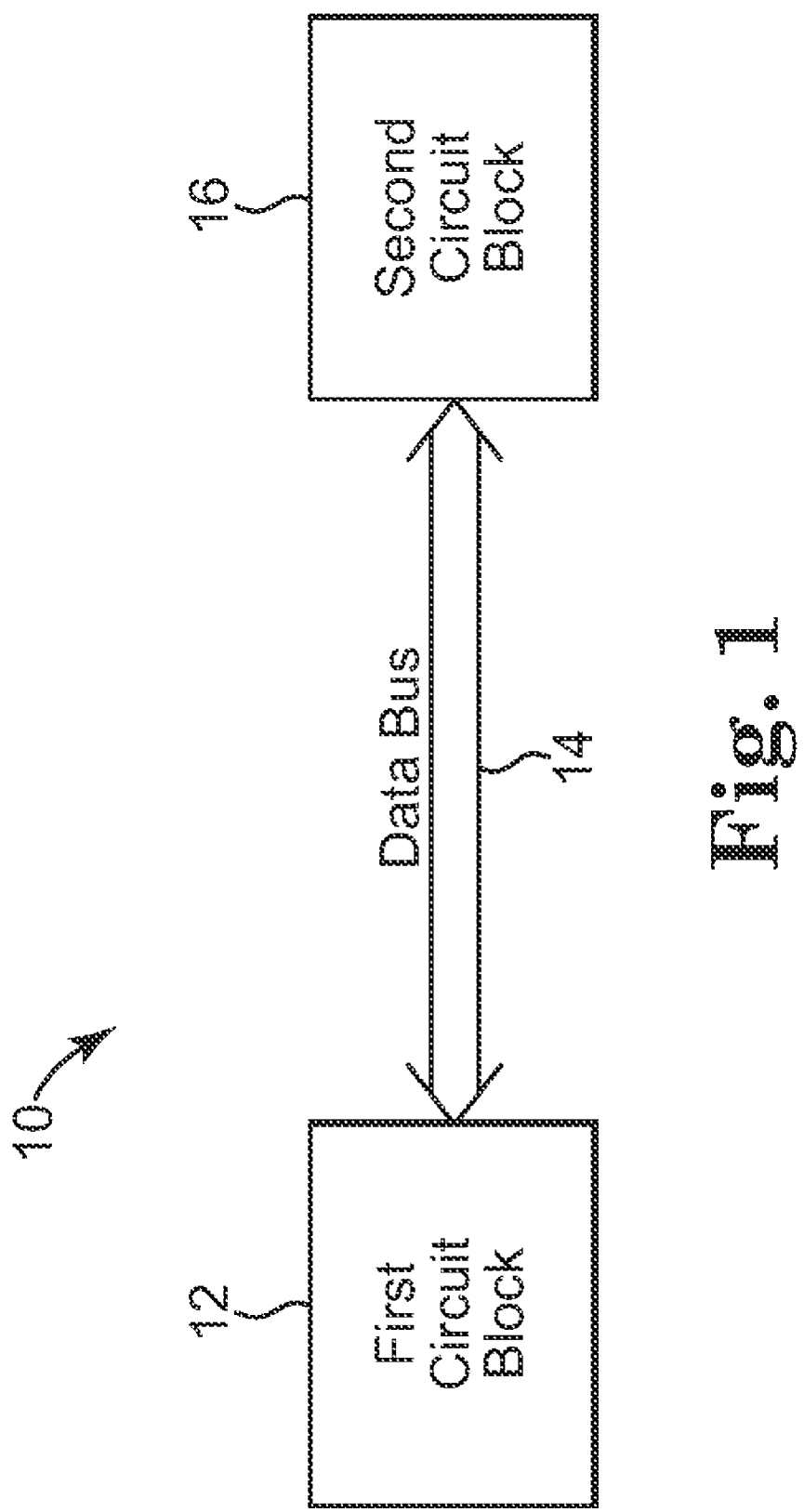
FIG. 1 illustrates a data processing system with a data bus.

FIG. 1 illustrates semiconductor data processing system 10, including first circuit block 12 and second circuit block 16, which are coupled together via data bus 14. In one example, data processing system 10 is an integrated circuit resident on a chip. In some applications, data processing system 10 represents a portion of a larger system for storing, reading and/or otherwise processing data.

In one embodiment, data bus 14 includes a plurality of generally parallel and relatively long metal lines or conductors. Each of the metal lines of data bus 14 can be used to transfer data from first circuit block 12 to second circuit block 16 or vice-a-versa. Because of their relative proximity to each other, each of the metal lines of data bus 14 may be subject to capacitive coupling from neighboring lines and connecting transistors may cause capacitive loading. As such, there can be increased switching power in transmitting data via data bus 14.

In situations where the voltage on one metal line is reduced from a logic high to a logic low while the voltage on an immediately adjacent line is moving in the opposite direction, the two lines are essentially fighting each other thereby requiring an increased amount of power to transfer these data signals. In the case of a large number of parallel lines in data bus 14, there can be "best-case" and "worst-case" scenarios.

In the best-case scenario, none of the lines of data bus 14 are switching. In the worst-case scenario all lines of data bus 14 are switching in opposite directions, such that each line is fighting every other line because the signals are moving in the opposite directions. In best-case scenario, the switching power required for the data transfer is at its minimum for data bus 14. The switching power then increases from this best-case scenario of no line switching to a scenario where there are a few lines switching. Switching power increases further from there to a scenario where all lines are switching in the same direction. Switching power then increase up to the maximum, which is the worst-case scenario where all lines are switching in the opposite direction.

While the average pattern on data bus 14 is typically random over long periods of time, in shorter periods of time the pattern can constitute something closer to a best-case scenario, with very little toggling, or can constitute something closer to a "worst-case scenario," with close to the maximum toggling on all of the lines of a bus.

In order to make data processing system 10 operational for all conditions of data transfer, system 10 is configured with sufficient power to allow operation under both the best-case and worst-case scenarios indicated above. As such, even though there will likely be an overall average power required for data transfer over a large period of time, system 10 is still designed such that it has sufficient power to allow operation under even under worst-case scenario. Such a scenario consumes more switching power, requiring a larger power source. Although it is possible to shield adjacent lines of data bus 14 from each other, in many small-scale applications it is simply impractical to do so.

Figure 2:
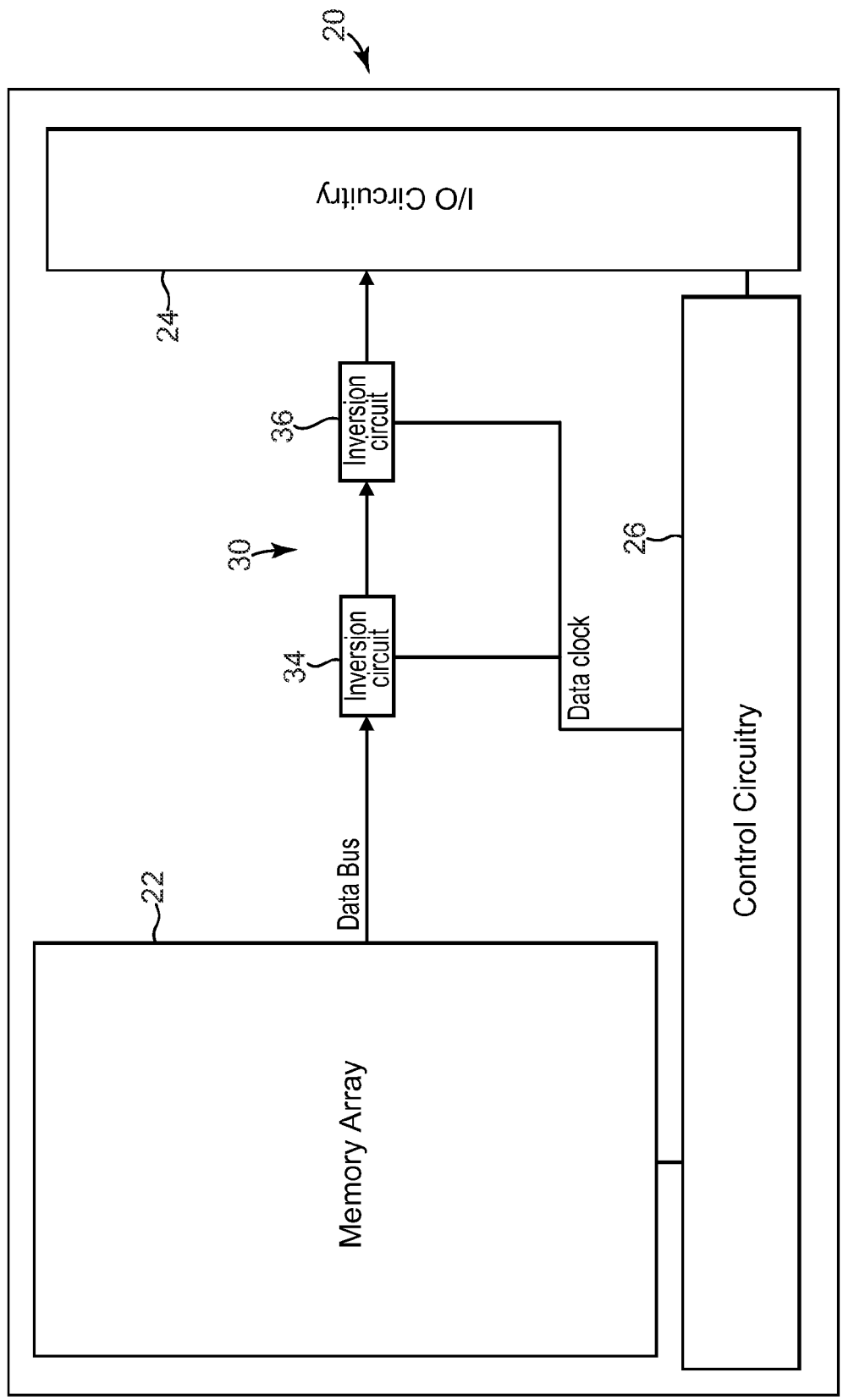
FIG. 2 illustrates a memory device with a data bus in accordance with one embodiment of the present invention.

FIG. 2 illustrates memory system 20 in accordance with one embodiment of the present invention. In one example, memory system 20 is a type of data processing system that includes memory array 22, input/output circuitry 24, and control circuitry 26. Also in the example, memory array 22 is coupled to I/O circuitry 24 via data bus 30. Furthermore, data bus 30 includes first inversion circuit 34 and second inversion circuit 36. First and second inversion circuits 34 and 36 are controlled via a data clock signal from control circuitry 26.

In one example, memory system 20 is a low-power DRAM chip. Memory array 22 can be located in a plurality of memory banks on the DRAM chip. Data bus 30 can then be used to transport data from memory array 22 to I/O circuitry 24. In one example, I/O circuitry 24 may include a plurality of data pads or "DQ pads". As such, in one exemplary operation control circuitry 26 receives command and address signals for retrieving data from memory array 22. Data is then retrieved from memory array 22 and transmitted via data bus 30 to I/O circuitry 24 in order to allow the data to be transmitted off of memory system 20, such as transferring data off a DRAM chip. For example, memory system 20 may be a low powered DRAM coupled to a memory controller or other device.

In one embodiment, data bus 30 uses significant switching power due to capacitive coupling and capacitive loading. For example, data bus 30 includes a large number of parallel wires to transfer data from memory array 22 to I/O circuitry 24. As such, there can be significant capacitive coupling between adjacent parallel lines of the data bus 30. Also, connecting transistors can cause significant capacitive loading.

Although the average data pattern on data bus 30 will typically be random over a long enough period of time, actual switching power consumption will be bounded by a peak or upper power requirement (in the worst-case scenario of a maximum amount of line switching) and a lower power requirement (in the best-case scenario of a no line switching). In order to remain operational, the system must be designed in order to provide sufficient power even for the upper power requirement case under the worst-case scenario.

In order to reduce the maximum power required for data transfer along data bus 30 due to switching power, one embodiment of the present invention provides first and second inversion circuits 34 and 36. In one case, first inversion circuit 34 is placed approximately halfway along the entire length of data bus 30. In one example, first inversion circuit 34 is placed at the electrical halfway point, that is, both halves of data bus 30 on either side of first inversion circuit 34 have approximately the same amount of coupling current consumption. In one example, the electrical halfway point for placement of first inversion circuit 34 may also be at the physical halfway point of the data bus 30.

First inversion circuit 34, under the control of control circuitry 26, then inverts a selected portion of the data that is transmitted over data bus 30. Second inversion circuit 36 then inverts this same selected portion of data before transferring it to I/O circuitry 24. In this way, the same data that leaves memory 22 via data bus 30 also arrives at I/O circuitry 24, that is, the data that was inverted on data bus 30 is re-inverted and returned to its original state before exiting data bus 30.

As the data moves along data bus 30, however, at least some selected portion of the data is inverted for approximately one-half the length of data bus 30, and that same selected portion is then non-inverted for approximately one-half the length of data bus 30. Inverting a selected portion of the data for half of the length of data bus 30 has the effect of lowering the peak power required for transmitting data due to switching power effects on the parallel lines of data bus 30.

In one embodiment, control circuitry 26 controls first and second inversion circuits 34 and 36 such that a periodic selected portion is inverted. In this way, the transmitted data need not be examined or analyzed at all in order to determine what portion of the data is the selected portion that is inverted for half of data bus 30 during transmission. As such, the design and operation of data bus 30 is relatively simple in that no comparison or other analysis circuitry, which would itself consume power and processing time, is needed to determine what data is inverted for transmission along data bus 30.

Figure 3:
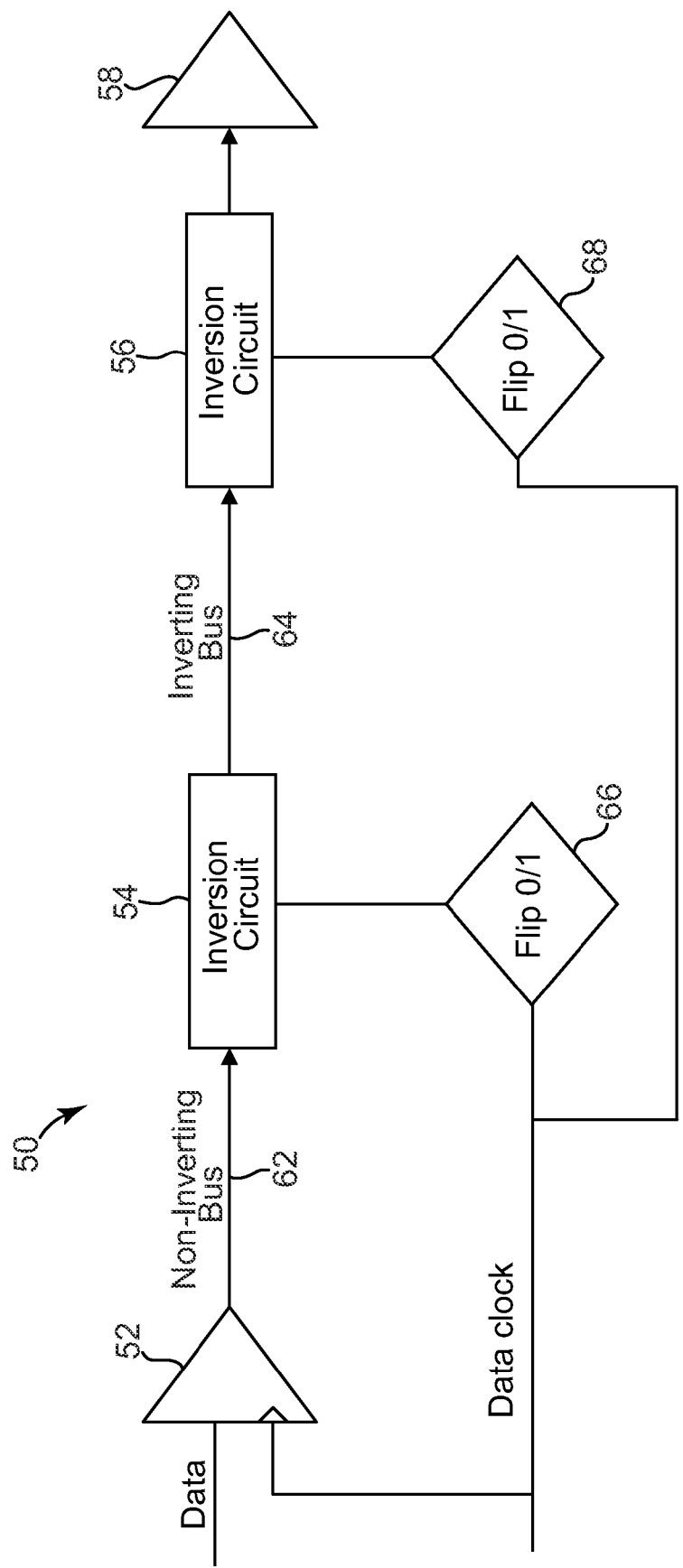
FIG. 3 illustrates a non-inverting and inverting data bus in accordance with one embodiment of the present invention.

FIG. 3 illustrates further detail of data bus 50 in accordance with one embodiment of the present invention. Data bus 50 includes first data buffer 52, first inversion circuit 54, second inversion circuit 56, and second data buffer 58. First buffer 52 is coupled to first inversion circuit 54 via non-inverting bus segment 62. First inversion circuit 54 is coupled to second inversion circuit 56 via inverting bus segment 64. Second inversion circuit 56 is then coupled to second data buffer 58.

A data clock is received by one of the inputs to first data buffer 52 and also by first and second flip second flip circuits 66 and 68. An output of first flip circuit 66 is received by first inversion circuit 54 and an output of second flip circuit 68 is received by second inversion circuit 56.

In one embodiment, data bus 50 is configured to be placed in a memory system, such as memory system 20 in FIG. 2. For example, data from memory array 22 can be received by one of the two inputs to first data buffer 52. Also, data is transmitted out of second data buffer 58 to I/O circuitry 24. In the example, control circuitry 26 produces the data clock for controlling various portions of data bus 50 and first and second flip circuits 66 and 68. One skilled in the art will see that data bus 50 can be configured within other data transmission applications as well.

In operation, data bus 50 is controlled to selectively invert data transmitted along it in order to decrease the peak power requirements. In this way, a system including data bus 50, such as semiconductor data processing system 10 or memory system 20, can be configured with a power source that need only meet this decreased peak power requirement, and can thus be smaller and more efficient.

In one example, the data clock signal is received by first data buffer 52, first flip circuit 66 and second flip circuit 68, and the clock signal thereby participates in the control of data transfer along data bus 50. Specifically, data is clocked with the data clock signal at the first data buffer 52. The data is not inverted as it is transmitted along the non-inverting bus segment 62. Then, a selected portion of the transferred data is inverted at first inversion circuit 54 when first flip circuit 66 toggles the data. The data is thus inverted as it is transmitted along the inverting bus segment 64. Then, the selected portion of the transferred data is inverted again at second inversion circuit 5 when second flip circuit 68 toggles the data. As such, the selected portion of data is re-inverted and returns to its original state when it reaches second data buffer 58. The clock signal can synchronize first and second flip circuits 66 and 68 to invert and then re-invert the selected portion of data.

Figure 4:
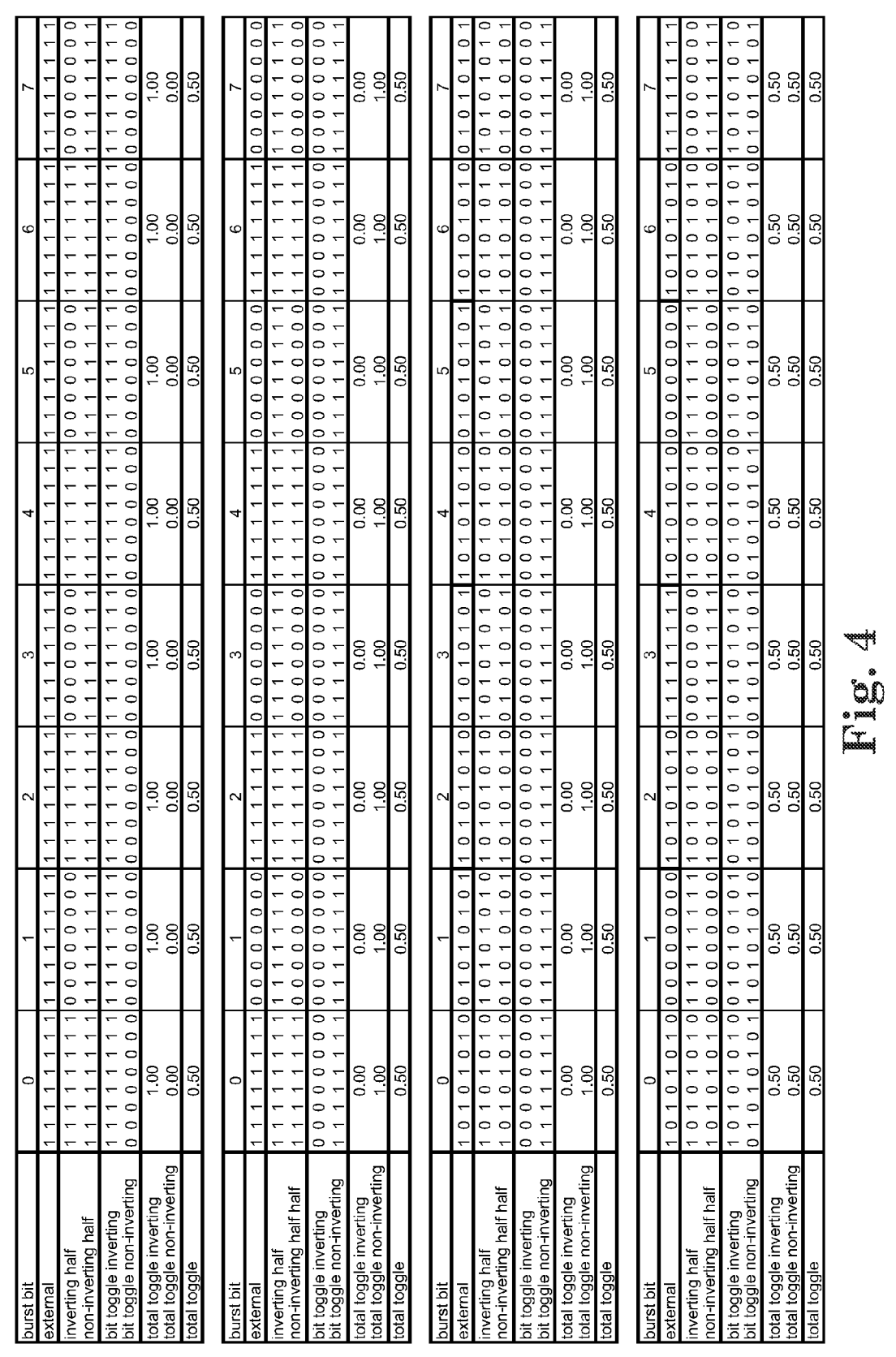

Various examples of pre-defined data that are transmitted on data bus 50 are illustrated in FIG. 4. FIG. 4 illustrates four such pre-defined data examples on four separate blocks from the top to the bottom of the sheet. Each exemplary block has 8 data burst bits, which are labeled 0-7 across the top of each block. In turn, each of the 8 data burst bits includes eight bits, which represent eight parallel lines on the data bus.

In the first such example of FIG. 4 (the upper-most block of the four illustrated), all of the bits in each burst that come from external to data bus 30 are "high" or 1. Thus, the data entering data bus 30 via first data buffer 52 are 1 and this is represented in the illustration by 1s in the "external" row. As such, in the non-inverting bus segment 62 all of the bits in each of the illustrated bursts are 1. This is represented in the illustration by 1s in the "non-inverting half" row. Also in the example, first and second inversion circuits 54 and 56 are controlled so that for every other data burst the bits are inverted. Consequently, in the inverting bus segment 64, the even-numbered burst bits are all 1 and the odd-numbered burst bits are all 0. This is represented in the illustration by 1s for the even-numbered burst bits and 0s for the odd-numbered burst bits in "inverting half" row.

Because all of the bits in the first example are 1 for the non-inverting bus segment 62, there is no toggling from burst bit to burst bit. This is represented in the illustration by 0s in the "bit toggle non-inverting" row (that is, no toggling). Also, because in the first example the even-numbered burst bits are all 1 and the odd-numbered burst bits are all 0 for the inverting bus segment 62, there is toggling in every case from burst bit to burst bit. This is represented in the illustration by 1s in the "bit toggle inverting" row.

Since there is never toggling in non-inverting bus segment 62 in the first example, each burst bit has a 0.00 average in the total toggle non-inverting row. Since there is always toggling in inverting bus segment 64 in the first example, each burst bit has a 1.00 average in the total toggle inverting row. As such, the total toggle for all burst bits as an average of the non-inverting and inverting bus segments 62 and 64 is 0.50. Thus, as can be seen from this first example, the inversion of every other data burst for half of the data bus decreases the peak power due to toggling by half.

In the second example of FIG. 4, all of the bits in each positive-numbered burst that come from external to data bus 30 are "high" or 1 and all of the bits in each negative-numbered burst that come from external to data bus 30 are "low" or 0. This is represented in the illustration by alternating 1s and 0s in the "external" row. As such, in the non-inverting bus segment 62, the even-numbered burst bits are all 1 and the odd-numbered burst bits are all 0. This is represented in the illustration by alternating 1s and 0s for every other burst in "non-inverting half" row. Also in the second example, first and second inversion circuits 54 and 56 are controlled so that for every other data burst the bits are inverted. Consequently, in the inverting bus segment 64 all of the bits in each of the illustrated bursts are 1. This is represented in the illustration by 1s for all burst bits in the "inverting half" row.

Because all of the bits in the second example are 1 for the inverting bus segment 64, there is no toggling from burst bit to burst bit. This is represented in the illustration by 0s in the "bit toggle inverting" row (that is, no toggling). Also, because in the second example the even-numbered burst bits are all 1 and the odd-numbered burst bits are all 0 for the non-inverting bus segment 62, there is toggling in every case from burst bit to burst bit. This is represented in the illustration by 1s in the "bit toggle non-inverting" row.

Since there is never toggling in inverting bus segment 64 in the second example, each burst bit has a 0.00 average in the total toggle inverting row. Since there is always toggling in non-inverting bus segment 62 in the second example, each burst bit has a 1.00 average in the total non-inverting row. As such, the total toggle for all burst bits as an average of the non-inverting and inverting bus segments 62 and 64 is 0.50. Thus, as is also seen from this second example, the inversion of every other data burst for half of the data bus decreases the peak power due to toggling by half.

In the third and fourth examples of FIG. 4, additional pre-defined data patterns are illustrated in the lower two blocks. When the data in the inverting half, non-inverting half, bit toggle inverting, bit toggle non-inverting, total toggle inverting, and total toggle non-inverting rows are examined, as explained above in reference to first and second examples above, it is evident that the total toggle for all burst bits as an average of the non-inverting and inverting bus segments 62 and 64 is always 0.50. Thus, as is also seen from these further examples, the inversion of every other data burst for half of the data bus decreases the peak power due to toggling by half.

Figure 5:
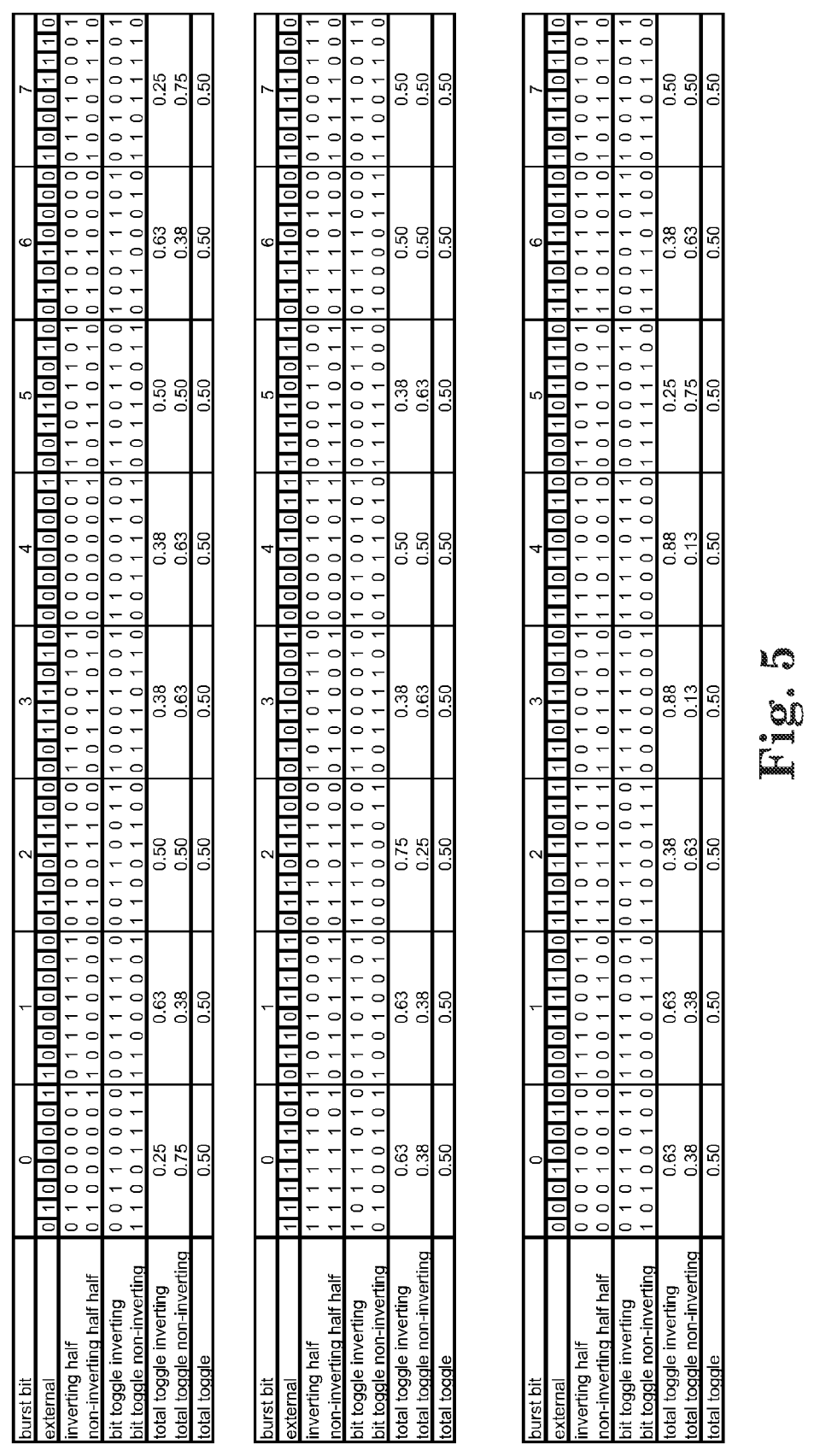

Various additional examples of random data patterns that are transmitted on data bus 50 are illustrated in FIG. 5. FIG. 5 illustrates three such random data patterns on three separate blocks from the top to the bottom of the sheet in the same format that is described above with respect to the pre-defined patterns illustrated in FIG. 4. Each exemplary block has 8 data burst bits, which are labeled 0-7 across the top of each block. In turn, each of the 8 data burst bits includes eight bits, which represent eight parallel lines on the data bus.

Again, when the data in the inverting half, non-inverting half, bit toggle inverting, bit toggle non-inverting, total toggle inverting, and total toggle non-inverting rows are examined, as explained above in reference to first and second examples of FIG. 4, it is evident that the total toggle for all burst bits as an average of the non-inverting and inverting bus segments 62 and 64 is always 0.50. Thus, as is also seen from these further examples, the inversion of every other data burst for half of the data bus decreases the peak power due to toggling by half.

The periodic inversion of selected portion of data decreases by half the peak power on the data bus due to toggling. Unlike prior systems that require additional circuitry and processing steps to first analyze and or compare the data before it enters the bus to determine what portions of the data should be inverted, the present system requires no analysis of the data before it is transmitted on the data bus. As such, peak power savings is achieve with a relatively simple and elegant design.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A semiconductor device comprising:
a first circuit block;
a second circuit block;
a data bus coupled between the first and second circuit blocks;
means for inverting a selected segment of data that is transferred onto the data bus and for re-inverting the selected segment of data before the data is transferred off the data bus without first analyzing the data to determine the selected segment of data that is inverted and for not inverting a remaining segment of data that is transferred by the data bus.

2. The semiconductor device of claim 1, further comprising a first data inverter on the data bus for inverting the selected segment of data that is transferred onto the data bus.

3. The semiconductor device of claim 2, further comprising a second data inverter at an end of the data bus for re-inverting the selected segment of data before the data is transferred off the data bus.

4. The memory component of claim 2, wherein the first data inverter is located at the half way point on the data bus.

5. A memory component comprising:
a first circuit block;
a second circuit block;
a data bus coupled between the first and second circuit blocks;
control circuitry for designating a selected segment of data for inversion on the data bus and designating a remaining segment of data for no inversion on the data bus;
a first data inverter on the data bus for inverting the selected segment of data that is transferred onto the data bus; and
a second data inverter at an end of the data bus for re-inverting the selected segment of data before the data is transferred off the data bus;
wherein the data that is transferred onto the data bus is not analyzed in order to determine the selected segment of data that is inverted.

6. The memory component of claim 5, wherein the first data inverter is located at the half way point on the data bus.

7. The memory component of claim 6, wherein the half way point on the data bus is approximately one half of the total physical length of the data bus.

8. The memory component of claim 6, wherein the half way point on the data bus is such that the portions of the data bus on either side of the first inversion circuit have approximately the same amount of coupling current consumption in transferring data.

9. A semiconductor device comprising:
a first circuit block;
a second circuit block;
a data bus coupling the first and second circuit blocks, the data bus configured to transmit data and having a first segment and a second segment;
wherein a selected portion of the data is inverted for one of the first and second segments and not inverted for the other of the first and second segments, both segments being transmitted on the data bus.

10. The semiconductor device of claim 9, wherein each of the first and second segments are approximately one-half of the length of the data bus.

11. The semiconductor device of claim 9, wherein each of the first and second segments have approximately the same amount of coupling current consumption in transferring data.

12. The semiconductor device of claim 9, wherein the data bus is comprised of a plurality of parallel metal lines.

13. The semiconductor device of claim 9, characterized in that no analysis is performed on data in order to determine which portion of the data is the selected portion for inversion.

14. The semiconductor device of claim 9, wherein the data bus configured to transmit data bursts and the selected portion of the data comprises one half of the total amount of bursts transmitted.

15. A method for transferring data comprising:
transferring data onto a data bus;
transmitting a selected segment of the data for approximately half of the data bus in a non-inverted form;
inverting the selected segment of data;
transmitting the selected segment of the data for approximately half of the data bus in an inverting form;
re-inverting the selected segment of data before the data is transferred off the data bus;
transmitting a remaining segment of data the entire length of the data bus in non-inverted form; and
transferring the data off the data bus.

16. The method of claim 15, wherein approximately half of the data bus is approximately one half of the total physical length of the data bus.

17. The method of claim 15, wherein approximately half of the data bus is the length of the data bus in which approximately half of the total coupling current of the data bus is consumed in transferring data.

18. The method of claim 15, wherein the method is characterized by the absence of analysis of the data in order to determine the selected segment of data that is inverted.

19. A method for transferring data comprising:
transferring data onto a data bus;
inverting a selected segment of the data for at least some segment of the data bus;
re-inverting the selected segment of data before the data is transferred off the data bus;
transmitting a remaining segment of data the entire length of the data bus in non-inverted form; and
transferring the data off the data bus;
wherein the method is characterized by the absence of analysis of the data in order to determine the selected segment of data that is inverted.

20. The method of claim 19, wherein approximately half of the data bus is approximately one half of the total physical length of the data bus.

21. The method of claim 19, wherein approximately half of the data bus is the length of the data bus in which approximately half of the total coupling current of the data bus is consumed in transferring data.

* * * * *